United States Patent [19]

Roman

[11] 4,405,451
[45] Sep. 20, 1983

[54] AIR SEPARATION APPARATUS AND SYSTEM

[75] Inventor: Walter C. Roman, Worthington, Ohio

[73] Assignee: BancOhio National Bank, Columbus, Ohio

[21] Appl. No.: 313,160

[22] Filed: Oct. 20, 1981

[51] Int. Cl.³ .............................................. B07B 4/02
[52] U.S. Cl. .................................. 209/136; 209/147; 209/154
[58] Field of Search ................ 209/3, 154, 134–137, 209/149, 147; 241/24, 19, DIG. 38

[56] References Cited

U.S. PATENT DOCUMENTS

| | | | |
|---|---|---|---|
| 2,162,392 | 6/1939 | Solomon | 209/137 |
| 3,341,009 | 12/1967 | Bennett et al. | 209/3 |
| 3,579,320 | 5/1971 | Pesses | 71/9 |
| 3,738,483 | 6/1973 | Mackenzie | 209/137 X |
| 3,836,085 | 9/1974 | Brown | 209/3 X |
| 4,098,464 | 7/1978 | Niedner et al. | 241/24 X |
| 4,113,185 | 9/1978 | Marsh et al. | 241/24 X |
| 4,134,731 | 1/1979 | Houser | 241/24 X |
| 4,137,155 | 1/1979 | Clin et al. | 209/134 X |
| 4,227,653 | 10/1980 | Jetzer | 241/24 |
| 4,253,940 | 3/1981 | Price | 209/3 |
| 4,264,352 | 4/1981 | Houser | 241/24 X |

FOREIGN PATENT DOCUMENTS

| | | | |
|---|---|---|---|
| 243531 | 9/1969 | U.S.S.R. | 209/134 |
| 757215 | 8/1980 | U.S.S.R. | 209/136 |

Primary Examiner—Ralph J. Hill
Attorney, Agent, or Firm—Mueller and Smith

[57] ABSTRACT

Apparatus and system for carrying out the air separation of waste wherein the waste is transported by conveyor to the input location of the housing of the apparatus, whereupon it is dropped. A fan having a selectively directed dual airstream is positioned to provide airstream interception of the material stream falling to a confrontation region. Baffling is provided to substantially eliminate turbulence as may be caused by the fan. Separation is developed at three outlets beneath a plenum of the apparatus and a deflector is positioned between that outet receiving organic and that outlet receiving plastic categorized materials. To improve separation, deflectors are mounted vertically on the housing walls to increase airstream velocity. Airstream guidance, deflection and baffling are made adjustable to tune the system to accommodate for variations in the consistency of waste.

31 Claims, 5 Drawing Figures

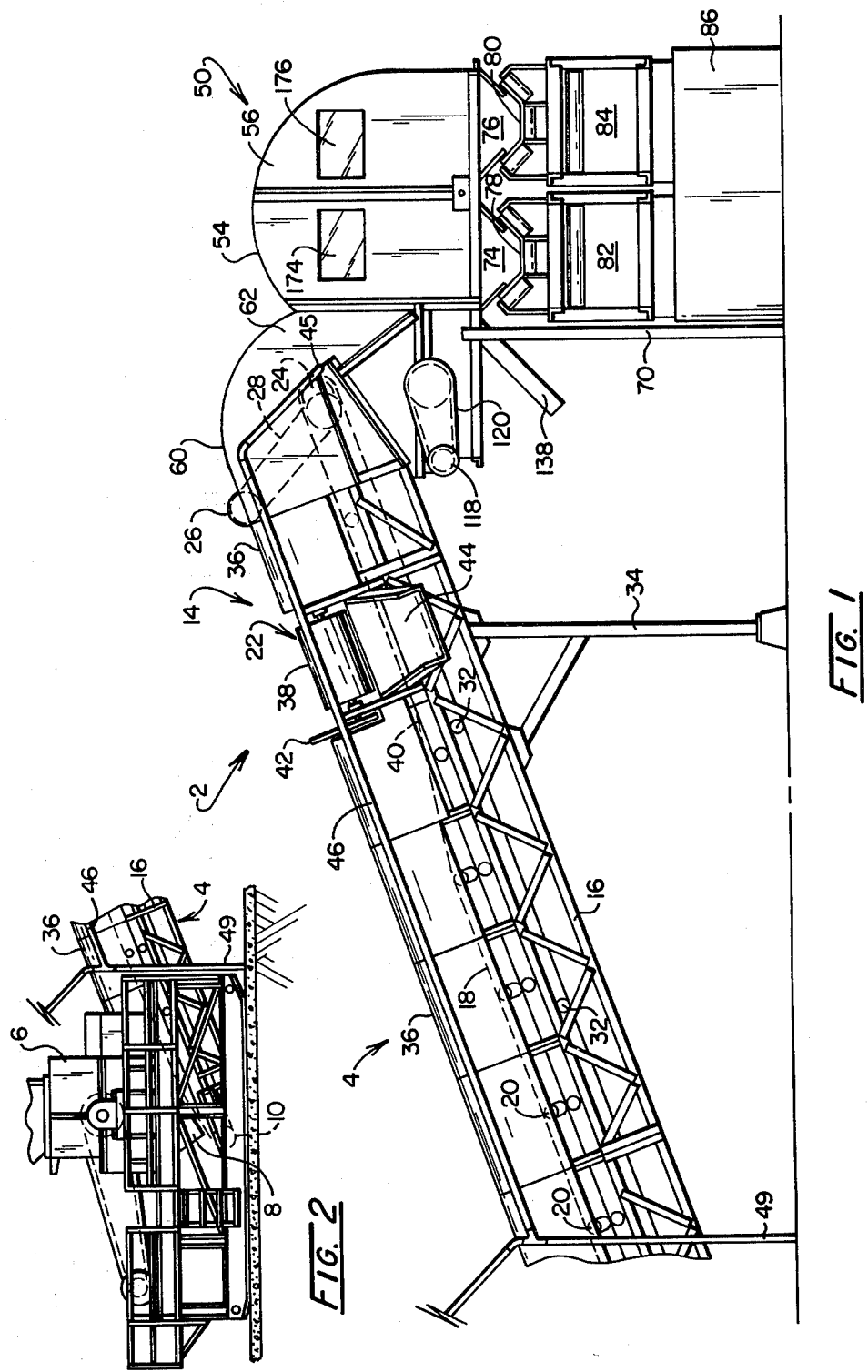

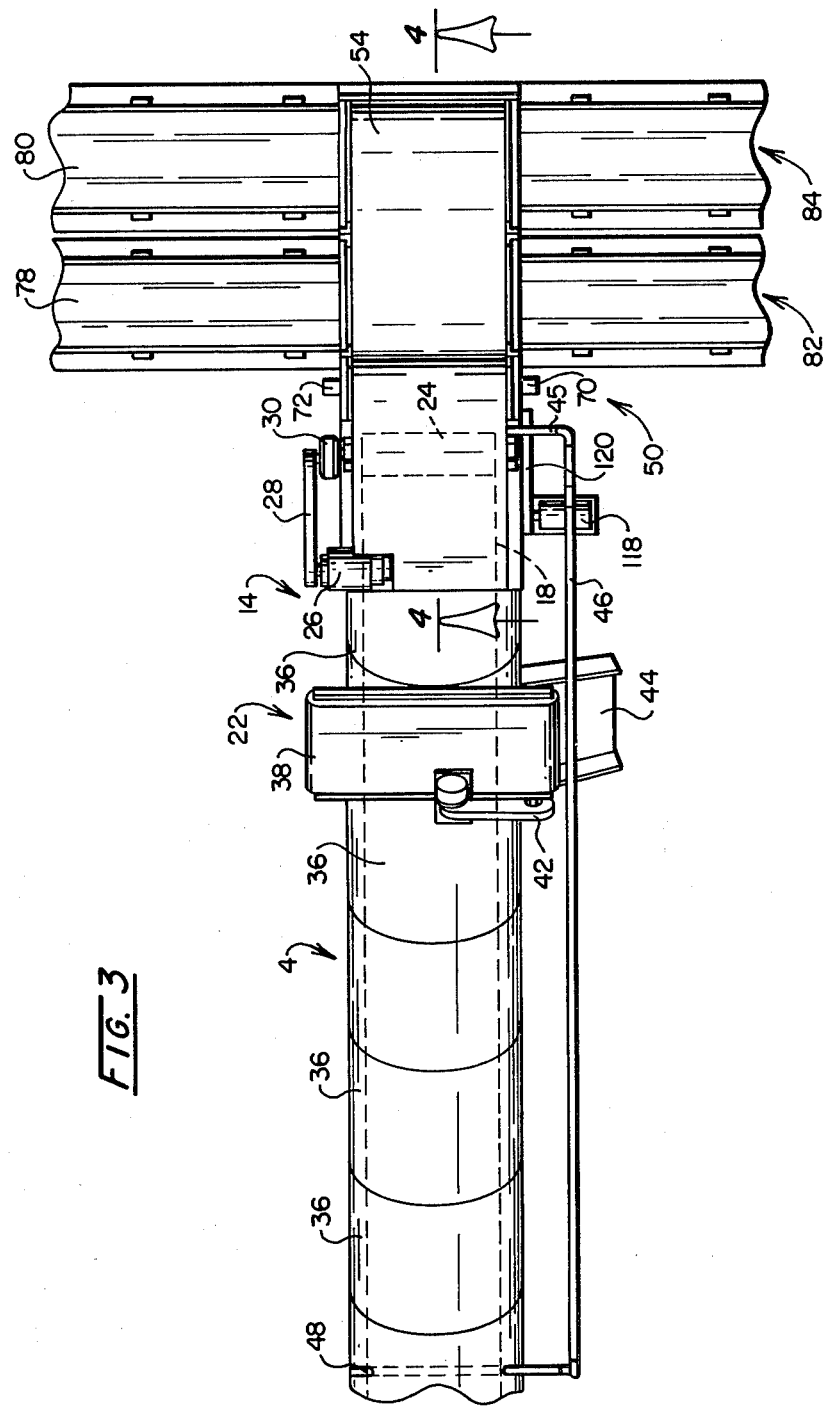

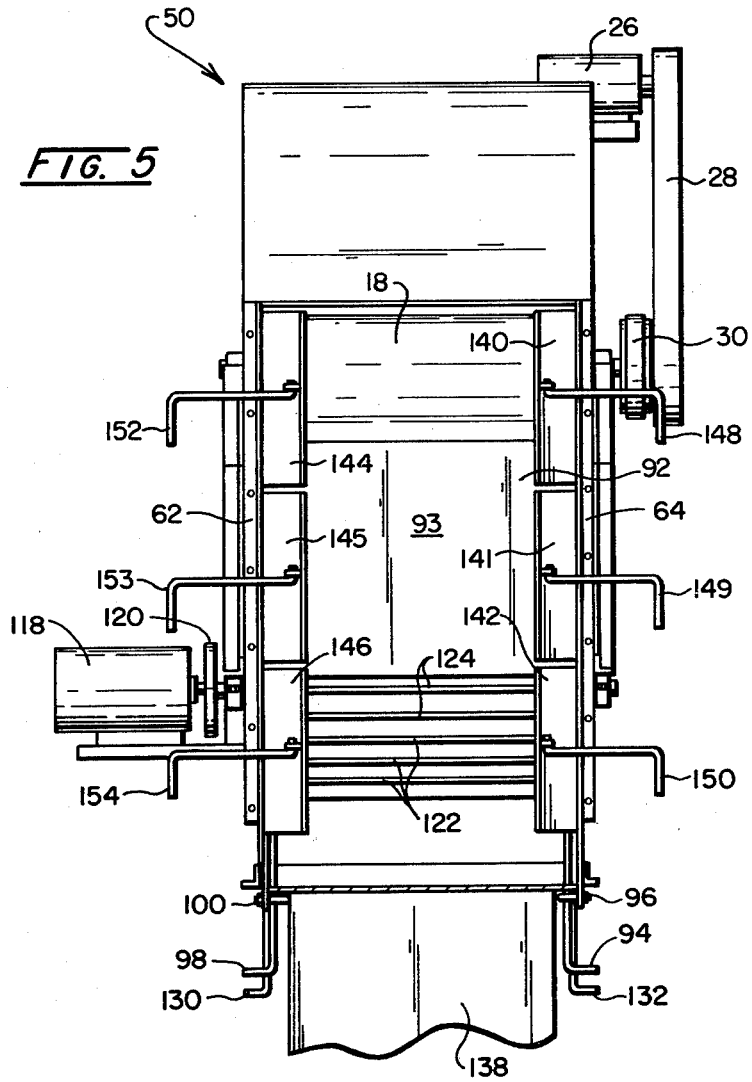

AIR SEPARATION APPARATUS AND SYSTEM

BACKGROUND OF THE INVENTION

Solid waste materials of the type typified by municipal waste traditionally have presented problems of disposal. These disposal difficulties have become increasingly critical as populations have expanded and as the per capita production of solid waste has increased. Conventionally, such solid waste has been disposed of by incineration and/or land fill. With the precent concern over problems associated with the protection of the environment, both of these traditional techniques of disposal have become undesirable. Further, separation systems, to remain efficient, must be capable of having a reasonably high throughput rate for the material processed. To the present, the throughput rates of conventional systems have not been adequately high to derive efficiencies permitting the use of such equipment in municipalities of smaller or medium size. However, because of the ever-increasing rigid requirements for carrying out waste treatment, some technique must be found to effectively increase such output rates.

Controlled composting procedures are considered to offer significant promise in the treatment of biodegradable industrial and municipal wastes and the compost product generated thereby represents a valuable and readily saleable product. A desired approach to treatment of waste by biodegradation is one where composting is carried out in the thermophilic phase at temperatures of about 45°–50° C. At such temperatures, bacteria otherwise active in the mesophilic phase at lower temperatures are avoided and noxious odors are not evolved in the course of digestion.

To achieve a marketable compost product, a waste treatment process should be carried out wherein raw refuse is passed through a variety of shredding or reduction, separation and related treatment stages. These stages serve to remove inorganic components such as metals and plastics and affect a reduction of average waste particle size. The segregated or separated by-product materials, such as ferrous and non-ferrous metals, glass and plastic increasingly are becoming valuable resources worthy of the expenditure of capital for effective separation equipment. Of course, the quality and resultant value of a compost by-product also is dependant upon the corresponding quality of separation, the presence of plastic or other foreign particles being undesirable or unacceptable for most commercial applications.

A broad variety of separation techniques have been known to industry, the more prominent approach being that of air separation. This technique, for example utilized in fan mills in early farming, is one wherein air is blown into the materials being separated. The density and other physical characteristics of the separated materials determines the distance which they are blown and that distance serves to effect a separation.

Where air separation techniques have been applied to municipal waste separation, designers have found that achieving high quality separation within reasonable cost limits proves to be an elusive goal. For example, municipal waste varies widely in make-up and consistency essentially from day to day. Thus, a uniform product is not available for separation treatment. Further in this regard, relatively large quantities of the material must be moved and manipulated about the treatment site and this manipulation, of itself, now has been discovered to represent a design parameter which must be accommodated for.

SUMMARY

The present invention is addressed to apparatus and system for carrying out the effective air separation or classification of waste materials with improved efficiency. This improved efficiency is achieved, inter alia, through the incorporation of selective baffling within the apparatus housing which avoids air turbulence in the region of vertical drop of the material, as well as through the utilization of material flow directors serving to position the falling waste at an optimum position for airstream confrontation.

Another feature and object of the invention resides in the provision of select guidance of the airstream developed within the separator by the fan thereof. This airstream can be adjusted with respect to its angle of attack thereof as it confronts falling waste material. In one aspect, airstream guidance, which may be provided by a louver-type series of thin blades, is adjusted to, in effect, establish two airstreams which are directed outwardly into a plenum of the apparatus. One such airstream is directed higher than the other and serves as a carrier ultimately joining with the lower air stream to move plastic categorized materials to an outlet. The lower disposed air stream, in particular, carries a substantial amount of wetted organic characterized materials such as paper or cardboard particles. Denser material such as inorganic categorized substances, for example, glass and non-ferrous metals, drop through the apparatus to a first of three serially disposed outlets. To improve separation, a restricting arrangement is mounted intermediate the plenum and region of vertical material movement. This arrangement provides a selectively restricted passageway through which the material is blown to enhance airstream velocity and improve separation efficiency.

Another object of the invention is to provide apparatus for carrying out the air separation of waste having plastic categorized materials, biodegradable categorized materials, and metal and glass characterized materials. The apparatus includes a housing having sidewalls and a top wall defining a plenum and an input location adjacent the top wall for receiving the waste as a falling particle stream. A fan is provided for producing a stream of air at an outlet thereof and a material flow directing arrangement is positioned to extend substantially between the input location for the material in the housing and the fan outlet for directing material toward an airstream confrontation region. Baffles are provided intermediate the fan outlet and the input region for restricting turbulent air flow in the vicinity of the material stream above the confrontation region. First, second and third outlets are provided, the first such outlet being positioned below the fan outlet and in substantial alignment with the confrontation region which serves for receiving metal and glass characterized materials. The second outlet is located adjacent the first outlet and beneath the plenum for receiving plastic categorized material. A deflector is mounted within the housing plenum intermediate the second and third outlets for selectively deflecting biodegradable categorized material toward the second outlet.

As another feature and object, the airstream guidance arrangement of the apparatus is configured to provide a first airstream confronting the material at the confrontation region and is directed upwardly into the plenum. The guidance arrangement also provides a second airstream confronting the material and which is directed upwardly into the plenum but beneath the first airstream. This guidance arrangement may be provided as a plurality of thin blades mounted at the fan outlet.

As another feature and object of the invention, apparatus for carrying out the air separation of material is provided as described above wherein an adjusting arrangement is provided for altering the angle of attack of the airstream output developed by the fan. Additionally, the material flow directing arrangement may be adjusted to improve separation and the deflector intermediate the second and third outlets may be adjusted. Thus, the separation apparatus may be adjusted or tuned for accommodating variations in the type of municipal waste or related materials submitted to it.

Another object of the invention is to provide a system for carrying out the air separation of waste having plastic categorized material, biodegradable characterized material and inorganic characterized material. The system includes a conveyor which receives the waste material at a tail region thereof and which continuously transports the material forwardly and upwardly to a head region, the material falling downwardly from the terminus of the conveyor at the head region. A housing having sidewalls and a top wall defining a plenum and having an input location adjacent the top wall for receiving the waste material from the terminus of the conveyor as a falling particle stream is provided. A fan is provided for producing a stream of air at an outlet thereof and a material flow directing arrangement is provided extending substantially between the input location for the material and the fan outlet for directing the material toward an airstream confrontation region. Additionally, a baffle is positioned intermediate the fan outlet and the input location in a manner restricting turbulent air flow in the vicinity of the material stream above the confrontation region. A first outlet is established below the fan and in substantial alignment with the confrontation region for receiving inorganic categorized material, a second outlet is located adjacent the first outlet and beneath the plenum for receiving biodegradable categorized material and a third outlet is located adjacent the second outlet and beneath the plenum for receiving plastic categorized material. Within the housing plenum intermediate the second and third outlets there is provided a deflector for selectively deflecting biodegradable categorized material toward the second outlet. Improved separation is achieved by an aqueous liquid application to the material where required in conjunction with the conveyor for removing static electrical charge which may be developed. This may be provided, for example, at the tail region of the conveyor. Additionally, the aqueous liquid is applied to the material in the vicinity of the input location to facilitate material movement, as well as to remove any of the aforesaid charges which may have developed.

As another aspect of the invention, the above-described system is provided including an airstream guidance arrangement which is configured to provide a first airstream confronting the material within the configuration region and which is directed upwardly into the plenum and a second airstream which confronts the material and which is directed upwardly into the plenum but beneath the first airstream. Adjustment arrangements are provided for deflection baffling and airstream direction to provide a form of tuning for the system which may be responsive to variations in the type material received for separation. Additionally, the system may include a restricting arrangement within the housing intermediate the plenum and the confrontation region for imposing a passageway of restricted opening to the airstream as well as the particles conveyed thereby to effect a select increase in the velocity of movement thereof.

Other objects of the invention will, in part, be obvious and will, in part, appear hereinafter. The invention, accordingly, comprises the apparatus and system possessing the construction, combination of elements and arrangement of parts which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIG. 1 is a partial, side-elevational view of the air separation system of the invention;

FIG. 2 is a partial, side-elevational view of the input of a conveyor shown in FIG. 1;

FIG. 3 is a top view of the system shown in FIG. 1;

FIG. 5 is a sectional view taken through the plane 5—5 of FIG. 4.

DETAILED DESCRIPTION

Figure 4:
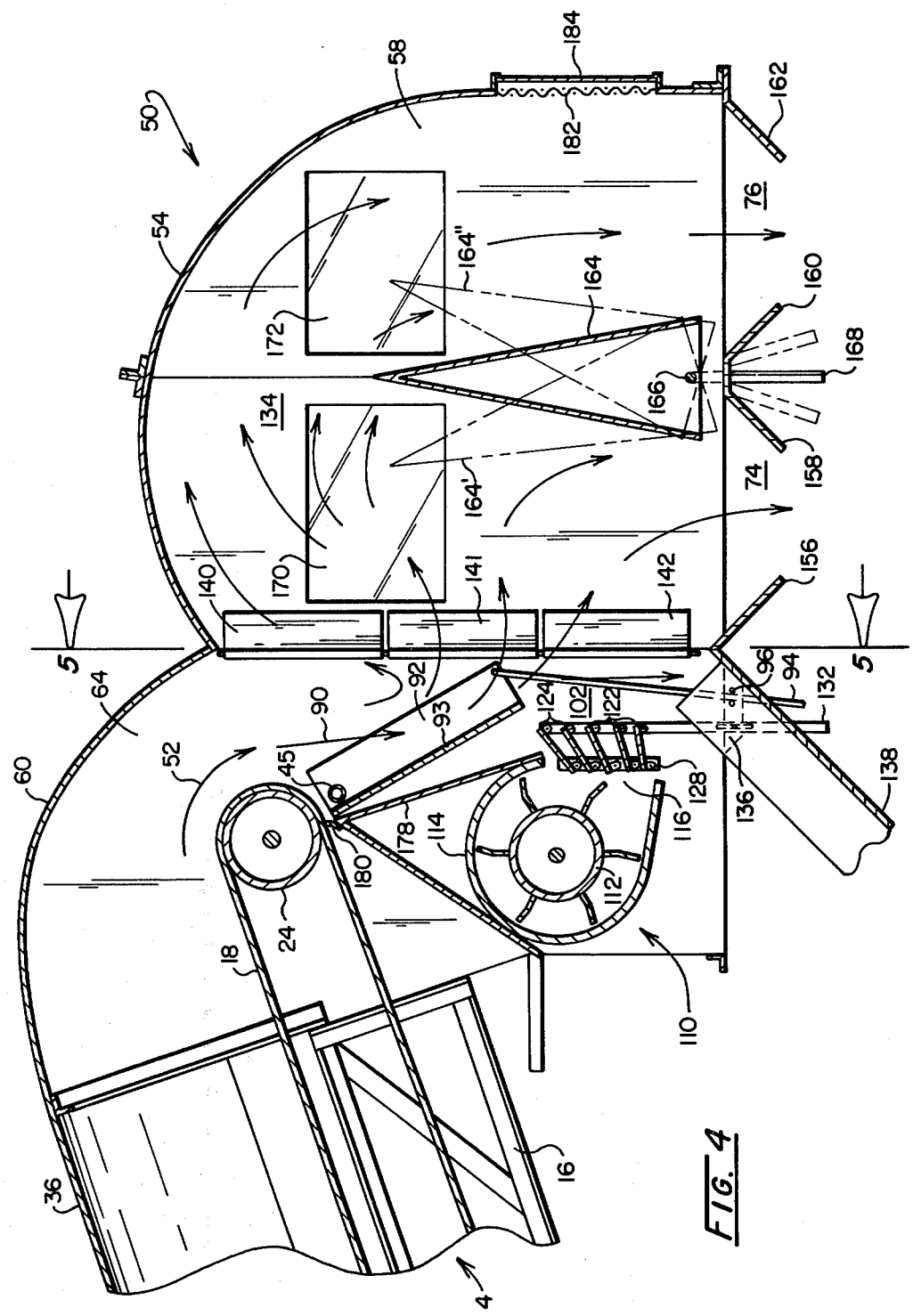
FIG. 4 is a partial sectional view of the structure shown in FIG. 3 taken through the plane 4—4 thereof.

The classification or separation system of the instant invention is revealed in general at 2 in conjunction with FIGS. 1 and 3. These figures show a conveyor, represented generally at 4 which collects waste material that, preferably, has been reduced to a relatively uniform particle size. In this regard, FIG. 2 shows the tail region of conveyor 4 as associated with a material reducing or shredding apparatus 6. Apparatus 6 is described in detail in copending application for United States patent entitled "Apparatus, Method and System for Reducing Waste Material", by Laughbaum, filed concurrently herewith and assigned in common herewith, Ser. No. 313,159 and drops size reduced waste into a hopper 8 positioned at the tail region of conveyor 4. Note that the conveyor extends to a tail pulley 10. Returning to FIG. 1, conveyor 4 transfers the material forwardly and upwardly to a head region thereof represented generally at 14. The system 2, for example, may be present as one aspect of an overall waste treatment facility such as is described in application for U.S. Pat. No. 4,302,236 by Roman, entitled "Composting System and Its Use in Scrubbing Gas Effluvia". Reduced particulate material is received at the hopper 8 of the conveyor 4 and generally will include inorganic categorized materials such as glass, non-ferrous metals and the like. Ferros metals also may be present or may have been separated from the raw waste earlier in the treatment facility procedures. The waste also will include organic or biodegradable materials such as paper, cardboard and/or garbage as well as inorganic materials which may be categorized as plastics. Conveyor 4 is of conventional structure including an elongate rigid steel frame 16 which carries an endless belt 18 in continuous orbit thereabout. Along the mid-portion of conveyor 4, the belt 18 is flexed by troughing rolls as at 20 to assume a trough cross-section which aids in retaining the waste materials thereon.

However, in the head region 14 of the conveyor the belt supporting rolls become flatened such that, if desired, ferrous materials may be removed at a ferrous material separating station 22 which is supported on the conveyor frame 16. Belt 18 passees over a head pulley 24 which provides drive thereto via a hydraulic motor 26 coupled through belt 28 and reduction assembly 30. Upon passing over drive or head pulley 24, belt 18 returns to the tail region of conveyor 4 in continuous orbit, return rolls facilitating this movement being represented at 32. The frame 16 is supported in an upward inclination by steel columns one of which is revealed in FIG. 1 at 34. The waste material conveyed by conveyor 4 is shielded from the elements by a sequence of conveyor covers 36, which covering is interrupted for purposes of receiving the ferrous metal separator apparatus 22. Looking to that apparatus, ferrous material separation is accomplished through the utilization of a magnet (not shown) which is mounted within a continuous belt 38 which is orbited over the material passing upon the flatened portion 40 of belt 18. Belt 38 is driven by the motor assembly 42 shown in FIG. 3 and the material thus magnetized and carried by belt 38 is maneuvered by the belt to a chute 44 for disposition as a valuable by-product. As an option, the ferrous metal removal may take place at earlier stages within the overall treatment system.

To carry out the separation of plastics from paper and cardboard, conventional practice has been to apply water or some aqueous liquid to the material as it enters the separation stage. This function is carried out in the instant system by transverse water pipe or conduit 45 extending into and over the head region 14 of conveyor 4. Conduit 45 is coupled with supply conduit 46 extending along conveyor 4. The spraying of this water serves another important function in the instant system, however. It has been determined that the belt 18, conventionally formed of nylon, develops static charge upon the material being transported thereby. These static charges upon the surface of the conveyed material tend to cause it to agglomerate into larger particles. Thus, unless such static charge is removed or prevented, the efficiency and resultant throughput rate available for the separation apparatus will be diminished to an important extent. The amount of moisture added from conduit 45 should be sufficient to remove static charge from the material being treated as well as to permit a proper separation of paper products from plastics. Aqueous liquid additionally is sprayed upon the material at belt 18 in the vicinity of the tail region of conveyor 4 via a transverse conduit 48 (FIG. 3) which, in turn, receives liquid supplied from vertical conduit 49 (FIG. 1). The spraying of water upon the material from conduit 48, as before, is adjusted for purposes of static charge removal as well as carrying out a necessary wetting of the paper and cardboard products to permit separation thereof from plastic categorized materials. In this regard, the plastic materials will not absorb the applied moisture, and thus, will be lighter to permit an air classification thereof.

Referring to FIG. 4, material having been properly wetted by conduit 48 and at head region 14 falls from the terminus of conveyor 4 at head pulley 24 into separation apparatus represented generally at 50 at an input location represented at arrow 52. Apparatus 50 includes a housing which extends in covering relationship over belt 18 and pulley 24. This housing of apparatus 50 includes a top wall portion 54 which is arcuate in cross-section and serves to define a plenum 134 in conjunction with attached sidewall portions 56 and 58. It may be observed that top wall portion 54 extends to adjacency with input top wall portion 60 located over the terminus of conveyor 4. Similarly, sidewall portions 56 and 58 extend to rearward sidewall portions as represented, respectively, at 62 and 64. The bottom of the housing of apparatus 50 is, for the most part, open and is supported on a frame including two steel columns 70 and 72. This support is provided such that two of the outlets thereof, 74 and 76, are respectively positioned over the belts 78 and 80 of corresponding conveyors 82 and 84. Supported upon a foundation 86, conveyor 82 functions as a trip conveyor as described in the above-identified application Ser. No. 122,882. This trip conveyor distributes biodegradable material along the first row of a windrowing digestion system. Conveyor 84 functions to deliver plastic categorized materials in an opposite direction from conveyor 82 to a receptacle for further processing and sale as a valuable by-product.

Looking additionally to FIG. 5, the interior of separating apparatus 50 is revealed in more detail. Material exiting from belt 18 of conveyor 12 at head pulley 24 falls by gravity somewhat vertically downwardly as represented by arrow 90. The items to be sorted may be described to be falling from conveyor 4 as a particulate stream. The stream of particulate material, however, is directed to optimize its ultimate confrontation with a classifying airstream. In this regard, the material initially falls upon a chute 92. Chute 92 is pivotally mounted within the housing of apparatus 50 by connection with transverse water conduit 45. The angular orientation of the base 93 of chute 92 is selected by virtue of the adjustment of a rod 94 pivotally connected thereto and retained in position by virtue of its connection with a U-bolt assembly shown generally 96. FIG. 5 shows that two such rods as at 94 serve to retain chute 92. For example, rod 98 supports the opposite side of the chute and is retained in position by U-bolt assembly 100 which is connected with sidewall 62. With the arrangement shown, aqueous liquid is sprayed from transverse conduit 45 upon the material stream leaving conveyor belt 18 and this water, in addition to providing necessary moisture for classification, for removing static electrical charge, also serves to facilitate the movement of the material across the base 93 of chute 92 by virtue of its flowing thereupon. The outlet of chute 92 serves to position the falling stream of waste particles at a confrontation region represented generally at 102 at which position the material encounters a stream of air generated by a fan 110 mounted upon housing 50. Fan 110 is of conventional design having a bladed rotor 112 and an arcuate housing 114. The fan outlet at 116 is mounted so as to be somewhat adjacent the confrontation region 102 at the outlet of chute 92 and power for rotating rotor 112 is derived from an electric motor 118 operating in conjunction with a belt and pulley assembly 120 (FIG. 1).

Returning to FIG. 4, it may observed that the outlet 116 of fan 110 contains an air stream guidance arrangement which includes thin metal blade groupings 122 and 124. Blade grouping 124 may be observed to have a steeper angle of attack with respect to vertical than blade grouping 122. Further, it may be observed that the blade orientations are maintained and are adjustable by virtue of their pivotal connection between stationary pivot support members 126 and 128 and corresponding adjusting rods, shown respectively at 130 and 132. With the arrangement shown, air blown through the structure of blades 122 and 124 forms a first air stream directed into the plenum 134 defined by top wall 54 and sidewalls 56 and 58. This first stream represents a form of carrier and is directed along the highest regions of plenum 134, while a second stream, developed through blade grouping 122, confronts the falling waste at a lesser angle of attack and ultimately joins with the first stream within plenum 134. The dual air stream arrangement has been found to improve the separating effectiveness of the apparatus.

During the air sorting operation of the apparatus 50, inorganic categorized material such as glass and non-ferrous metal generally falls directly downwardly toward a first outlet in the region identified at 136. This material is received by a chute 138 which directs it into a collection bin (not shown). From that bin or other suitable conveyor, secondary sorting takes place to separate, for example, non-ferrous metals from glass as well as to segregate various forms of glass.

The airstream generated by fan 110 and directed through blades 122 and 124 further is enhanced for purposes of improving separation or classification capability by an airstream restricting arrangement which is positioned intermediate the confrontation region 102 and plenum 134 and imposes a passageway of restricted opening to the airstream carrying particulate matter to be classified thus deriving an increase in the velocity thereof in the manner of a venturi effect. FIGS. 4 and 5 show a series of three elongate deflector blades 140–142 hingedly coupled to sidewall 64, while a similar series, 144–146 are hingedly coupled to sidewall 62. The angle of attack of these restricting blades can be varied to suit the desires of the operator and in accordance with the variations which are encountered in the type of waste being classified. In this regard, blades 140–142, respectively, are adjusted by rods 148–150 which extend through sidewall 64. Similarly, blades 144–146 are adjustable with respect to the angle of attack of the airstream passing therethrough by respective rods 152–154. Rods 148–150 and 152–154 may be locked into position by any suitable connectors (not shown).

With the arrangement shown, wetted paper products and other biodegradable materials will fall towards the second outlet 74 whereupon it is deflected by deflectors 156 and 158 onto the belt 78 of tripper conveyor 82. The plastic particles which will not have absorbed the water or other aqueous liquid sprayed thereonto from conduits 45 and 48 are carried along a higher arcuate locus of travel and exit from opening or third outlet 76. As before, deflectors 160 and 162 are provided for the purpose of guiding the plastic categorized materials onto belt 80 of conveyor 84.

Note that intermediate outlets 74 and 76 there is provided a deflector 164 of triangular cross-section which extends between sidewalls 56 and 58 of plenum 134. This deflector is pivotally mounted to the latter sidewalls at 166 and further is coupled with a downwardly extending arm 168. Arm 168 may be manually manipulated to pivot deflector 164 about connection 166 to alternately desired positions, for example as shown in phantom at 164' and 164". Adjustment of the deflector 164 is made by the operator as he observes the air sorting process taking place through windows 170 and 172. Oppositely disposed windows are shown in FIG. 1 at 174 and 176.

FIG. 4 additionally reveals the presence of a planar surface baffle 178 of triangular cross-section which extends between sidewalls 62 and 64. The baffle 178 extends generally from the outlet 116 of fan 110 upwardly to the lower disposed region of conveyor belt 18. At the uppermost point of the baffle 178, a flexible scrapper 180 is positioned which wipes against belt 18 in its lower orbit to effect a cleaning thereof. As is apparent, the wiper 180 also may be attached to the upper edge of chute 92. Baffle 178 serves to avoid the development of air turbulence about the material as it is directed towards confrontation region 102. The figure also shows the presence of a screen 182 positioned within top wall 54. Where enclosed conveyors are associated, for example, with outlet 76 the back pressures which may develop may affect the classification operation of apparatus 50 adversely. Thus, an opportunity for venting such pressure is provided by screen 182. The degree of opening permitted by screen 182 may be controlled by conventional sliding door assembly 184.

As indicated earlier herein, the apparatus 50 is designed so as to afford a broad flexibility for the operator thus to accommodate a broad variation in consistencies of municipal waste and the like which is being separated or classified. In this regard, the positioning of the falling material stream may be regulated by adjusting the position of chute 92. Further, the direction of the airstream may be varied by adjustment of blade groupings 122 and 124. The velocity of the particle carrying airstream can be regulated by manipulation of the restricting baffles 140–142 and 144–146 while, additionally, baffle 164 may be maneuvered to improve the separation between wetted paper products and the like and plastics. Note further that screen 182 and associated door 184 may be adjusted with respect to any developing back pressures associated with covered conveyors. Where a power loss is encountered in connection with fan 110, the chute 92 may be pivotally elevated to a point where all material passing therefrom may be directed through outlet 74. In this arrangement, the material will not be separated, however, such separation may take place following the digestion of the biodegradable material therein.

Since certain changes may be made in the above-described system and apparatus without departing from the scope of the invention herein involved, it is intended that all matter contained in the description thereof or shown in the accompanying drawings shall be interpreted as illustrative and not in a limiting sense.

I claim:

1. Apparatus for carrying out the air separation of waste having plastic categorized materials, biodegradable categorized materials and metal and glass categorized materials said waste being continuously transported by a conveyor to a terminus thereof at an elevated location to fall therefrom as a particle stream, comprising:

a housing having an input top wall portion extending over said conveyor terminus and a pair of mutually spaced first sidewall portions extending from said input top wall portion substantially adjacent said falling particle stream, said housing having plenum wall components and including an arcuate top wall portion extending from said input top wall portion substantially at said terminus level and coupled with a spaced pair of second sidewall portions to define a plenum;

fan means for producing a stream of air at an outlet thereof, said outlet being positioned within said housing intermediate said first sidewall portions and spaced from and below said terminus;

airstream guidance means for directing said fan means stream of air along a select direction toward said plenum substantially upwardly into lifting confrontation with said particle stream and toward said plenum arcuate top wall portion;

means positioned intermediate said fan means outlet and said conveyor for restricting air flow therebetween;

first outlet means positioned below the said level of said fan means and in substantial alignment with said terminus for receiving said metal and glass categorized materials;

second outlet means located against said first outlet means and beneath said plenum for receiving said biodegradable categorized materials;

third outlet means located adjacent said second outlet means and beneath said plenum for receiving said plastic categorized material;

deflector means mounted within said housing plenum intermediate said second and third outlet means and extending toward said arcuate top wall portion for selectively adjusting the flow of air within said plenum and deflecting said biodegradable categorized material toward said second outlet means; and means defining openings within said plenum wall components for effecting air back pressure dissipation.

2. The apparatus of claim 1 including conduit means coupled with said housing for providing a selective flow of aqueous liquid upon said material in the vicinity of said terminus.

3. The apparatus of claim 1 in which said airstream guidance means is provided as a plurality of thin blades mounted at said fan means opening.

4. The apparatus of claim 3 in which said blades are configured to provide a first airstream confronting said particle stream and directed upwardly into said plenum, and a second airstream confronting said particle stream and directed upwardly into said plenum beneath said first airstream.

5. The apparatus of claim 3 including first adjusting means coupled with said blades for establishing the angle of attack of said blades with respect to said stream of air.

6. The apparatus of claim 1 including material flow directing means extending substantially between said terminus and said fan means outlet and being provided as a chute pivotally mounted to said housing adjacent said terminus, said chute having an outlet.

7. The apparatus of claim 6 including conduit means adjacent said input location for selectively flowing aqueous liquid along said chute to moisten and promote the passage of said material therealong.

8. The apparatus of claim 6 including second adjusting means coupled with said chute for selectively varying the position of the outlet thereof with respect to said particle stream.

9. The apparatus of claim 8 wherein said second adjusting means is configured for positioning said chute outlet to effect the movement of all said material particles through said second outlet means in the absence of a fan means generated airstream.

10. The apparatus of claim 1 in which said airstream guidance means is configured to provide a first airstream confronting said particle stream and directed upwardly into said plenum, and a second air stream confronting said particle stream and directed upwardly into said plenum beneath said first airstream.

11. The apparatus of claim 10 in which said deflector means is configured to provide a flat planar surface substantially confronting said second airstream.

12. The apparatus of claim 1 including restricting means within said housing intermediate said plenum and said particle stream for imposing a passageway of restricted opening to said airstream to effect a select increase in the velocity thereof.

13. The apparatus of claim 12 wherein said restricting means comprises at least one elongate deflector mounted upon a said housing second sidewall portions.

14. The apparatus of claim 13 wherein one elongate edge of said deflector is pivotally mounted upon said second sidewall portion and selectively adjustable with respect thereto to vary said restricted opening.

15. The apparatus of claim 1 including third adjusting means coupled with said deflector means for selectively altering the angular orientation thereof within said plenum.

16. A system for carrying out the air separation of waste having plastic categorized material, biodegradable categorized material and inorganic categorized material, comprising:

conveyor means for receiving said waste material at a tail region thereof and continuously transporting said material forwardly and upwardly to a head region thereof, said material falling downwardly as a particle stream from the terminus of said conveyor at said head region;

a housing having an input top wall portion extending over said conveyor terminus and a pair of mutually spaced first sidewall portions extending from said input top wall portion substantially adjacent said falling particle stream, said housing having plenum wall components and including an arcuate top wall portion extending from said input top wall portion substantially at said terminus level and coupled with a spaced pair of second sidewall portions to define a plenum;

fan means for producing a stream of air at an outlet thereof, said outlet being positioned within said housing intermediate said first sidewall portions and spaced from and below said terminus;

airstream guidance means for directing said fan means stream of air along a select direction toward said plenum substantially upwardly into lifting confrontation with said particle stream and toward said plenum arcuate top wall portion;

means positioned intermediate said fan means outlet and said conveyor for restricting air flow therebetween;

first outlet means positioned below the said level of said fan means and in substantial alignment with said terminus for receiving said inorganic categorized materials;

second outlet means located adjacent said first outlet means and beneath said plenum for receiving said biodegradable categorized materials;

third outlet means located adjacent said second outlet means and beneath said plenum for receiving said plastic categorized material;

deflector means mounted within said housing plenum intermediate said second and third outlet means and extending toward said arcuate top wall portion for selectively adjusting the flow of air within said plenum and deflecting said biodegradable categorized material toward said second outlet means;

means mounted upon said conveyor means for substantially removing static electrical charge from said material as is developed thereon by said conveyor means; and means defining openings within said plenum wall components for effecting air back pressure dissipation.

17. The system of claim 16 including conduit means coupled with said housing for providing a selective flow of aqueous liquid upon said material in the vicinity of said conveyor means terminus.

18. The system of claim 16 including means for applying aqueous liquid to said waste material when transported by said conveyor means in an amount effective to substantially remove static electrical charge from said material as is developed thereon by said conveyor means and effective to carry out separation of said plastic categorized material from said biodegradable categorized material.

19. The system of claim 16 including means for applying aqueous liquid to said material in the vicinity of said conveyor means tail region in an amount substantially effective to effect an avoidance of static charge development thereon.

20. The system of claim 16 in which said airstream guidance means is provided as a plurality of thin blades mounted at said fan means opening.

21. The system of claim 20 in which said airstream guidance means is configured to provide a first airstream confronting said particle stream and directed upwardly into said plenum, and a second air stream confronting said material and directed upwardly into said plenum beneath said first airstream.

22. The system of claim 20 including first adjusting means coupled with said blades and extending outwardly of said housing for establishing the angle of attack of said blades with respect to said stream of air.

23. The system of claim 16 including material flow directing means extending substantially between said terminus and said fan means outlet and being provided as a chute attached to said housing adjacent said terminus, said chute having an outlet.

24. The system of claim 23 including conduit means adjacent said input location for selectively flowing aqueous liquid along said chute to promote the passage of said material therealong.

25. The system of claim 23 including second adjusting means coupled with said chute for selectively varying the position of the outlet thereof with respect to said particle stream.

26. The system of claim 25 wherein said second adjusting means is configured for positioning said chute outlet to effect the movement of all said material particles through said second outlet means in the absence of a fan means generated airstream.

27. The system of claim 16 in which said airstream guidance means is configured to provide a first airstream confronting said particle stream and directed upwardly into said plenum, and a second air stream confronting said particle stream and directed upwardly into said plenum beneath said first airstream.

28. The system of claim 27 in which said deflector means is configured to provide a flat planar surface substantially confronting said second airstream.

29. The system of claim 16 including restricting means within said housing intermediate said plenum and said particle stream for imposing a passageway of restricted opening to said airstream to effect a select increase in the velocity thereof.

30. The system of claim 29 wherein said restricting means comprises at least one elongate deflector mounted upon a said housing sidewall.

31. The system of claim 30 wherein one elongate edge of said deflector is pivotally mounted upon said sidewall and selectively adjustable with respect thereto to vary said restricted opening.

* * * * *